United States Patent [19]
Park et al.

[11] Patent Number: 5,872,770
[45] Date of Patent: Feb. 16, 1999

[54] RECEIVED ASYNCHRONOUS TRANSFER MODE LAYER OPERATION AND MAINTENANCE CELL PROCESSING APPARATUS

[75] Inventors: Yeong Ho Park; Hun Kang, both of Daejeon, Rep. of Korea

[73] Assignee: Electronics and Telecommunications Research Institute, Daejeon, Rep. of Korea

[21] Appl. No.: 753,014

[22] Filed: Nov. 19, 1996

[30] Foreign Application Priority Data

Dec. 21, 1995 [KR] Rep. of Korea ............... 1995-53162

[51] Int. Cl.[6] .................. G01R 31/08; G06F 11/00; G08C 15/00
[52] U.S. Cl. ............... 370/249; 370/395; 370/250; 370/474
[58] Field of Search ............... 370/242, 249, 370/250, 251, 465, 426, 474–475, 496, 390, 395, 339, 392; 371/20.4, 20.5, 34, 35, 37.1, 37.7

[56] References Cited

U.S. PATENT DOCUMENTS

| | | | |
|---|---|---|---|
| 5,274,641 | 12/1993 | Shobatake et al. | 370/392 |
| 5,369,649 | 11/1994 | Murayama et al. | 371/73.1 |
| 5,636,206 | 6/1997 | Amemiya et al. | 370/244 |
| 5,659,540 | 8/1997 | Chen et al. | 370/249 |

FOREIGN PATENT DOCUMENTS

0518199  12/1992  European Pat. Off. .

*Primary Examiner*—Chi H. Pham
*Assistant Examiner*—Steven Nguyen
*Attorney, Agent, or Firm*—Antonelli, Terry, Stout & Kraus, LLP

[57] ABSTRACT

A received ATM layer OAM cell processing apparatus for processing in real time a fault management cell among ATM layer OAM cells of F4/F5 levels applied to a user network interface and a network node interface and performing CRC-10 and CRC-32 operations with respect to the other ATM layer OAM cells such as activation/deactivation cells, a resource management cell, a system management cell and a meta signaling cell, not processed in real time. Further, the received ATM layer OAM cell processing apparatus processes in real time a performance management cell among the ATM layer OAM cells of F4/F5 levels applied to the user network interface and network node interface. Therefore, the received ATM layer OAM cell processing apparatus can accumulate in real time performance information such as the total number of received performance management cell blocks, the number of received error cell blocks, the number of received excessive errored cell blocks, the number of lost cells, the number of misinserted cells, the number of discarded cells, the number of tagged cells and the total number of received cells with respect to a specified ATM virtual connection, thereby measuring the service quality and network parameter.

11 Claims, 5 Drawing Sheets

RECEIVED ASYNCHRONOUS TRANSFER MODE LAYER OPERATION AND MAINTENANCE CELL PROCESSING APPARATUS

BACKGROUND OF THE INVENTION

1. Field of the Invention

The present invention relates to a received asynchronous transfer mode (referred to hereinafter as ATM) layer operation and maintenance (referred to hereinafter as OAM) cell processing apparatus.

2. Description of the Prior Art

Recently, various communication network techniques have been actively developed all over the world to provide broadband integrated service digital network (referred to hereinafter as B-ISDN) services. In such communication network techniques, OAM cells of an ATM layer must be processed for fault and performance management. Such an OAM cell processing technique must be developed ahead of other techniques for the management of B-ISDN and the international standardization thereof is being actively advanced. The development of such an OAM cell processing technique can be generally divided into hardware and software parts.

SUMMARY OF THE INVENTION

Therefore, the present invention has been made in view of the above problem, and it is an object of the present invention to provide a received ATM layer OAM cell processing apparatus for processing in real time a fault management cell among ATM layer OAM cells of Virtual Path (VP)/Virtual Channel (VC) (referred hereafter as F4/F5) levels applied to a user network interface and a network node interface and performing cyclic redundancy check (referred to hereinafter as CRC)-10 and CRC-32 operations with respect to the other ATM layer OAM cells such as activation/deactivation cells, a resource management cell, a system management cell and a meta signaling cell, which are not processed in real time.

In accordance with the present invention, the above and other objects can be accomplished by a received ATM layer OAM cell processing apparatus, comprising received user cell monitoring means for extracting a channel identifier from a header of a received user cell, analyzing an active forward monitoring channel identifier and, when the received user cell corresponds to a specified connection in accordance with the analyzed result, extracting Bit Interleaved Parity-16 (referred to hereafter as BIP-16) value from a payload of the received user cell and a cell loss priority value from the header of the received user cell and inferring a connection identifier from the extracted channel identifier; cyclic redundancy check means for performing a cyclic redundancy check operation with respect to received Operation and Maintenance/Meta-signalling cells (referred hereafter OAM/META, discarding the received OAM/META when a cyclic redundancy check error is present in the received OAM/META cells as a result of the cyclic redundancy check operation and outputting the received OAM/META cell as normal cells when no cyclic redundancy check error is present in the received OAM/META cells as a result of the cyclic redundancy check operation; OAM/META cell classification means for classifying the normal OAM/META cells from the cyclic redundancy check means according to OAM type and function type identifiers, which are used to classify detail OAM cells and meta signalling cells according to specific ATM connection identifiers and meta signaling cell processing means for receiving a meta signaling cell from the OAM/META cell classification means and transferring the received meta signaling cell without performing a separate process; activation/deactivation cell processing means for receiving activation/deactivation cells from the OAM/META cell classification means and transferring the received activation/deactivation cells without performing a separate process; resource management cell processing means for receiving a resource management cell from the OAM/META cell classification means and transferring the received resource management cell without performing a separate process; system management cell processing means for receiving a system management cell from the OAM/META cell classification means and transferring the received system management cell without performing a separate process; central processing unit interface means for performing an interface operation with a central processing unit; OAM cell storage means for storing therein the meta signaling cell from the meta signaling cell processing means, the activation/deactivation cells from the activation/deactivation cell processing means, the resource management cell from the resource management cell processing means and the system management cell from the system management cell processing means and transferring the stored cells to the central processing unit through the central processing unit interface means; alarm cell processing means for receiving the channel identifier of the received user cell from the received user cell monitor means, declaring the first alarm state when it receives the first alarm cell from the OAM/meta cell classification means, releasing the first alarm state when it receives no first alarm cell or any busy cell for a predetermined time period, declaring a second alarm state when it receives a second alarm cell from the OAM/META cell classification means and releasing the second alarm state when it receives no second alarm cell for the predetermined time period; continuity check cell processing means for receiving the channel identifier of the received user cell from the received user cell monitor means and checking whether a user cell from the received user cell monitor means or a continuity check cell from the OMA/META cell classification means is received for a specified connection within a predetermined time period, when a continuity check cell check function is made active with respect to the specified connection; loopback cell processing means for receiving a loopback cell from the OAM/META cell classification means and checking a call source identifier and a loopback location identifier of the received loopback cell; and performance management cell processing means for receiving a performance management cell from the OAM/META cell classification means, producing a backward reporting cell when the received performance management cell is a forward monitoring cell, outputting the produced backward reporting cell to transmission OAM cell processing means, extracting performance information from the received performance management cell when it is a backward reporting cell, accumulating the extracted performance information and transferring the accumulated performance information to the central processing unit through the central processing unit interface means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
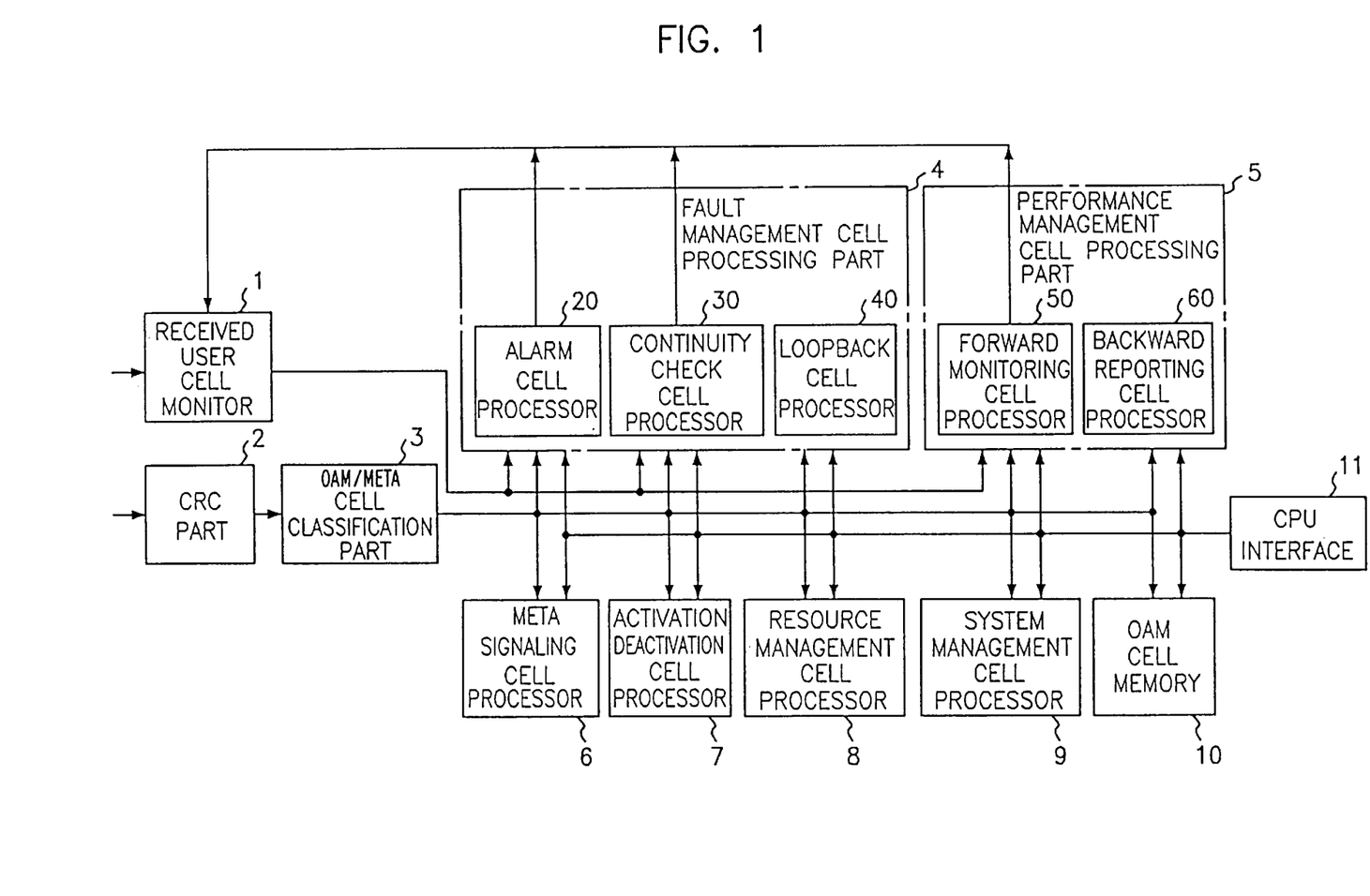
FIG. 1 is a schematic block diagram illustrating the construction of a received ATM layer OAM cell processing apparatus in accordance with an embodiment of the present invention.

FIG. 1 is a schematic block diagram illustrating the construction of a received ATM layer OAM cell processing apparatus in accordance with an embodiment of the present invention. In this drawing, the reference numeral 1 designates a received user cell monitor, the reference numeral 2 designates a CRC part, the reference numeral 3 designates an OAM-META cell classification part, the reference numeral 4 designates a fault management cell processing part, the reference numeral 5 designates a performance management cell processing part, the reference numeral 6 designates a meta signaling cell processor, the reference numeral 7 designates an activation/deactivation cell processor, the reference numeral 8 designates a resource management cell processor, the reference numeral 9 designates a system management cell processor, the reference numeral 10 designates an OAM cell memory and the reference numeral 11 designates a central processing unit (referred to hereinafter as CPU) interface. The fault management cell processing part 4 includes an alarm cell processor 20, a continuity check cell processor 30 and a loopback cell processor 40. The performance management cell processing part 5 includes a forward monitoring cell processor 50 and a backward reporting cell processor 60.

The received user cell monitor 1 is adapted to extract a channel identifier VPI/VCI from the header of a received user cell and to transfer the extracted channel identifier VPI/VCI to the alarm cell processor 20 and continuity check cell processor 30 in the fault management cell processing part 4. Also, the received user cell monitor 1 analyzes a current forward monitoring channel identifier VPI/VCI from the forward monitoring cell processor 50 in the performance management cell processing part 5. When the received user cell corresponds to a specified connection in accordance with the analyzed result, the received user cell monitor 1 extracts a BIP-16 value from the payload of the received user cell and a cell loss priority value CLP from the header of the received user cell, infers a connection identifier from the extracted channel identifier VPI/VCI and transfers the extracted BIP-16 value and cell loss priority value CLP and the connection identifier to the forward monitoring cell processor 50.

The inferred connection identifier is an internal value which is mapped onto the channel identifier VPI/VCI of the header of the received user cell. Only when the number of the connection identifier of the received user cell monitor 1 is the same as the number of connections to be processed in the forward monitoring cell processor 50, it can be mapped onto the channel identifier VPI/VCI of the header of the received user cell.

The received user cell monitor 1 performs a monitoring function with respect to the received user cell by filtering only a specified portion of the header of the received user cell according to the type (user network interface/network node interface) of the interface to be applied and the type (F4/F5) of the level of OAM processing.

The CRC part 2 is adapted to perform a CRC operation with respect to received OAM/META cells. When a CRC error is present in the received OAM/META cells as a result of the CRC operation, the CRC part 2 discards the received OAM cells. However, when no CRC error is present in the received OAM/META cells as a result of the CRC operation, the CRC part 2 transfers the received OAM/META cells to the OAM/META cell classification part 3. To this end, the CRC part 2 is basically provided with a CRC-10 part, a CRC-32 part and a CRC error accumulator. The CRC-32 part performs a CRC-32 operation with respect to a meta signaling cell among the received OAM/META cells. When a CRC error is present in the meta signaling cell as a result of the CRC-32 operation, the CRC-32 part discards the meta signaling cell. However, when no CRC error is present in the meta signaling cell as a result of the CRC-32 operation, the CRC-32 part transfers the meta signaling cell to the OAM/META cell classification part 3. The CRC-10 part performs a CRC-10 operation with respect to the received OAM cells. When a CRC error is present in the received OAM cells as a result of the CRC-10 operation, the CRC-10 part discards those OAM cells. However, when no CRC error is present in the received OAM cells as a result of the CRC-10 operation, the CRC-10 part transfers those OAM/META cells to the OAM cell classification part 3.

The CRC-32 part performs the CRC-32 operation with respect to the meta signaling cell on the basis of the following generating polynomial:

$$G(x)=x^{32}+x^{26}+x^{23}+x^{22}+x^{16}+x^{12}+x^{11}+x^{10}+x^{8}+x^{7}+x^{5}+x^{4}+x^{2}+x+1$$

The CRC-10 part performs the CRC-10 operation with respect to the other OAM cells on the basis of the following generating polynomial:

$$G(x)=x^{10}+x^{9}+x^{5}+x^{4}+x+1$$

The CRC error accumulator accumulates CRC errors and transfers the accumulated value to a CPU when it exceeds a predetermined threshold value. Alternatively, the CRC part 2 may process all the received OAM/META cells as normal cells without performing the CRC operation.

The OAM/META cell classification part 3 is adapted to classify the OAM/META cells received from the CRC part 2 according to OAM type/function type identifiers and specific meta signalling ATM connection identifies. The OAM cells classified according to the OAM type/function type identifiers and function types are Alarm Indication Signal/Remote Defection Indication (referred to hereafter as AIS/RDI) cell, a continuity check cell and a loopback cell among fault management cells, a forward monitoring cell and a backward reporting cell among performance management cells and performance management activation/deactivation cells and continuity check activation/deactivation cells among activation/deactivation cells. A system management cell is classified according to only the OAM type identifiers. A resource management cell is classified according to only a PTI value of a header thereof.

Also, the OAM cell classification part 3 extracts channel identifiers VPI/VCI from headers of the received OAM cells and transfers the extracted channel identifiers VPI/VCI to the OAM cell processors.

When meta signaling cell is classified in a separate function block such as, for example, a received cell header, processing block before the transfer to the OAM/META cell classification part 3. As a result, the OAM/META cell classification part 3 transfers the meta signaling cell to the meta signaling cell processor 6 in response to a separate cell identifier.

The OAM cell classification part 3 stores OAM cells which do not require real-time processing and will be standardized in the future into the OAM cell memory 10. The OAM cells stored in the OAM cell memory 10 are transferred to the CPU through the CPU interface 11.

The meta signaling cell processor 6 is adapted to store the meta signaling cell transferred from the OAM/META cell classification part 3 into the OAM cell memory 10 without performing a separate processing.

The activation/deactivation cell processor 7 is adapted to store the activation/deactivation cells transferred from the OAM cell classification part 3 into the OAM cell memory 10 without performing a separate processing.

The resource management cell processor 8 is adapted to store the resource management cell transferred from the OAM/META cell classification part 3 into the OAM cell memory 10 without performing a separate processing.

The system management cell processor 9 is adapted to store the system management cell transferred from the OAM/META cell classification part 3 into the OAM cell memory 10 without performing a separate processing.

The OAM cell memory 10 is adapted to store the output cells from the meta signaling cell processor 6, activation/deactivation cell processor 7, resource management cell processor 8 and system management cell processor 9 therein and to transfer the stored cells to the CPU through the CPU interface 11.

As mentioned above, the fault management cell processing part 4 includes the alarm cell processor 20, the continuity check cell processor 30 and the loopback cell processor 40.

The alarm cell processor 20 is adapted to receive the channel identifier VPI/VCI of the received user cell from the received user cell monitor 1 and the channel identifier VPI/VCI of the continuity check cell from the OAM cell classification part 3. When the alarm cell processor 20 receives an alarm cell AIS of a specified connection from the OAM cell classification part 3, it stores the channel identifier VPI/VCI of the received alarm cell AIS into its internal memory and declares an alarm state AIS. If the alarm cell processor 20 receives no alarm cell AIS or any busy cell (user cell or continuity check cell) for the specified connection for a predetermined time period, it releases the alarm state AIS. Also, when the alarm cell processor 20 receives an alarm cell RDI of a specified connection from the OAM/META cell classification part 3, it stores the channel identifier VPI/VCI of the received alarm cell RDI into its internal memory and declares an alarm state RDI. When the alarm cell processor 20 receives no alarm cell RDI for the specified connection for the predetermined time period, it releases the alarm state RDI. The alarm state release time may preferably be 3 sec. Alternatively, the alarm state release time may be any value other than 3 sec.

The continuity check cell processor 30 is adapted to receive the channel identifier VPI/VCI of the received user cell from the received user cell monitor 1 and the channel identifier VPI/VCI of the continuity check cell from the OAM/META cell classification part 3. When a continuity check cell check function is made active with respect to a specified connection, the continuity check cell processor 30 checks whether the user cell or the continuity check cell is received for the specified connection within a predetermined time period. The continuity check alarm state declaration time may preferably be 3.5 sec. Alternatively, the continuity check alarm state declaration time may be any value other than 3.5 sec.

The loopback cell processor 40 is adapted to receive the loopback cell from the OAM/META cell classification part 3. The loopback cell processor 40 provides a function of checking a call source identifier and a loopback location identifier of the received loopback cell and selectively disables it. When a loopback indicator of the received loopback cell is "0", the loopback cell processor 40 transfers information of the received loopback cell to the CPU through the OAM cell memory 10. When the loopback indicator of the received loopback cell is "1", the loopback cell processor 40 sets the loopback indicator to "0" and stores the information of the received loopback cell into its internal cell buffer to perform a self-loopback operation with no intervention of the CPU. Alternatively, the loopback cell processor 40 may transfer the information of the received loopback cell directly to the OAM cell memory 10 with no change of the loopback indicator of the received loopback cell. In this case, the CPU processes the information of the loopback cell from the loopback cell processor 40 in a software manner.

As mentioned above, the performance management cell processing part 5 includes the forward monitoring cell processor 50 and the backward reporting cell processor 60.

The forward monitoring cell processor 50 is adapted to receive the forward monitoring cell from the OAM/META cell classification part 3. The forward monitoring cell processor 50 produces a backward reporting cell in response to the received forward monitoring cell and outputs the produced backward reporting cell to transmission OAM cell processing means. The backward reporting cell processor 60 is adapted to receive the backward reporting cell from the OAM/META cell classification part 3. The backward reporting cell processor 60 extracts performance information from the received backward reporting cell, accumulates the extracted performance information and transfers the accumulated performance information to the CPU through the CPU interface 11. Similarly, the forward monitoring cell processor 50 extracts performance information from the produced backward reporting cell, accumulates the extracted performance information and transfers the accumulated performance information to the CPU through the CPU interface 11.

Figure 2:
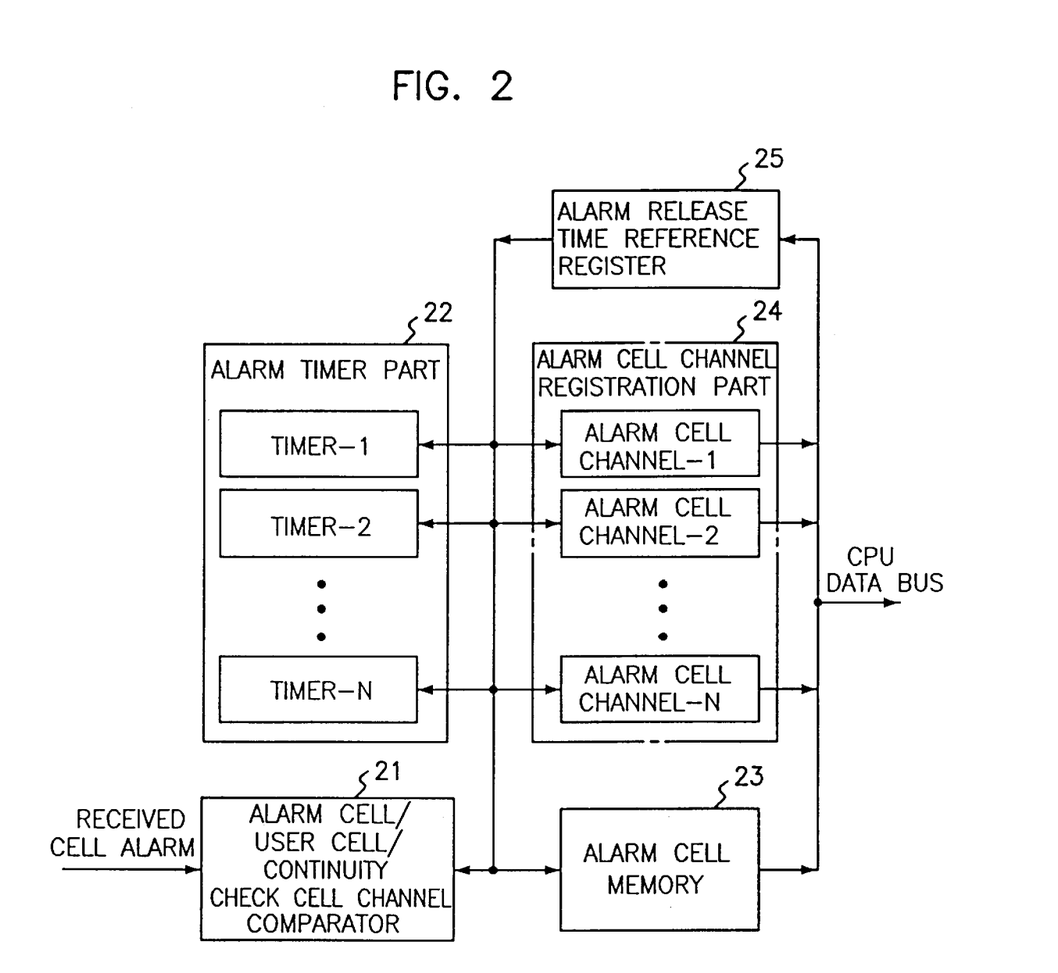
FIG. 2 is a detailed block diagram illustrating the construction of an alarm cell processor in a fault management cell processing part in FIG. 1 in accordance with the embodiment of the present invention.

FIG. 2 is a detailed block diagram illustrating the construction of the alarm cell processor 20 in the fault management cell processing part 4 in FIG. 1 in accordance with the embodiment of the present invention. In this drawing, the reference numeral 21 designates an alarm cell/user cell/continuity check cell channel comparator, the reference numeral 22 designates an alarm timer part, the reference numeral 23 designates an alarm cell memory, the reference numeral 24 designates an alarm cell channel registration part and the reference numeral 25 designates an alarm release time reference register.

The alarm cell/user cell/continuity check cell channel comparator 21 is adapted to receive the channel identifier VPI/VCI of the received user cell from the received user cell monitor 1 and the channel identifiers VPI/VCI of the alarm cell and continuity check cell from the OAM/META cell classification part 3. The alarm cell/user cell/continuity check cell channel comparator 21 compares the received channel identifiers VPI/VCI with channel identifiers VPI/VCI of active connections from the alarm cell memory 23, processed in a hardware manner. Also, the alarm cell/user cell/continuity check cell channel comparator 21 compares the type of the alarm cell from the OAM/META cell classification part 3 with an alarm type AIS/RDI from the alarm cell memory 23. Then, the alarm cell/user cell/continuity check cell channel comparator 21 classifies the compared results according to the active connections. When the alarm state declaration is set by the alarm cell AIS, the alarm cell/user cell/continuity check cell channel comparator 21 performs the comparison operation with respect to the channel identifier VPI/VCI of the received user cell from the received user cell monitor 1 and the channel identifiers VPI/VCI of the alarm cell and continuity check cell from the OAM/META cell classification part 3. When the alarm state declaration is set by the alarm cell RDI, the alarm cell/user cell/continuity check cell channel comparator 21 performs the comparison operation with respect to only the channel identifier VPI/VCI of the alarm cell from the OAM/META cell classification part 3. The alarm cell/user cell/continuity check cell channel comparator 21 produces match signals in accordance with the channel identifier compared results and outputs the produced match signals to the alarm timer part 22 and the alarm cell channel registration part 24. Also, the alarm cell/user cell/continuity check cell channel comparator 21 performs the channel identifier comparison operation by filtering only a specified portion of the headers of the user cell, alarm cell and continuity check cell according to the type (user network interface/network node interface) of an interface to be applied and the type (F4/F5) of a level to be OAM-processed.

When the alarm cell AIS or RDI received from the OAM/META cell classification part 3 corresponds to a specified connection which is made inactive in the alarm cell channel registration part 24, the alarm cell/user cell/continuity check cell channel comparator 21 selects one of empty regions in the alarm cell channel registration part 24 which can be processed in a hardware manner and transfers information regarding the channel identifier VPI/VCI and type of the received alarm cell to the selected region in the alarm cell channel registration part 24 to make the specified connection active. When no empty region which can be processed in a hardware manner is present in the alarm cell channel registration part 24, the alarm cell/user cell/continuity check cell channel comparator 21 transfers the information of the received alarm cell to the CPU through the alarm cell memory 23. When the alarm cell AIS or RDI received from the OAM/META cell classification part 3 is made active for the first time in the alarm cell processor 20, the alarm cell/user cell/continuity check cell channel comparator 21 transfers the information of the received alarm cell to the CPU through the alarm cell memory 23 to allow the CPU to grasp the detailed information of connections which are made active in the alarm cell channel registration part 24.

The alarm timer part 22 includes a plurality of timers corresponding respectively to alarm connections in the alarm cell channel registration part 24. The operation of each timer in the alarm timer part 22 is started in response to the corresponding timer active information from the alarm cell channel registration part 24 and reset in response to the corresponding match signal from the alarm cell/user cell/continuity check cell channel comparator 21. At the moment that an output value from each timer in the alarm timer part 22 becomes the same as a reference value stored in the alarm release time reference register 25, the alarm cell channel registration part 24 determines that the alarm state of the corresponding connection has been released and then makes the corresponding connection inactive. The operation of each timer in the alarm timer part 22 is stopped in response to the corresponding timer inactive information from the alarm cell channel registration part 24.

The alarm cell memory 23 is adapted to store therein the information regarding the alarm type of the channel identifier VPI/VCI AIS/RDI, error form and position of the received alarm cell, transferred from the alarm cell/user cell/continuity check cell channel comparator 21. The alarm cell memory 23 transfers the stored information to the CPU. The alarm cell memory 23 can substantially store a plurality of alarm cells therein, but is configured as if it stores a single alarm cell on a memory map of the CPU. When the CPU reads the last address on the memory map thereof, the alarm cell memory 23 regards the present state as the completion of a read operation of the CPU.

Upon storing one or more alarm cells, the alarm cell memory 23 generates an interrupt signal to indicate the type of alarm cell to be now transferred to the CPU. At this time, the generation of the interrupt signal is performed after the CPU reads the previous alarm cell. The alarm cell memory 23 manages the order of its memory locations to map the contents therefrom onto the memory map of the CPU.

Such a configuration of the alarm cell memory 23 has the effect of reducing the area of the memory map of the CPU. The CPU reads the alarm cell from the alarm cell memory 23 and then informs the alarm cell memory 23 of the read completion to provide a new cell reception region to the alarm cell memory 23. As a result, the alarm cell memory 23 can be increased in efficiency.

The alarm cell channel registration part 24 is adapted to store therein information states of channels which are processed in a hardware manner and channel identifiers and types AIS/RDI of active information connections. The alarm cell channel registration part 24 transfers the stored connection information to the alarm cell/user cell/continuity check cell channel comparator 21 and the alarm timer part 22. Also, the alarm cell channel registration part 24 makes the active connections inactive in response to the corresponding match signals from the alarm cell/user cell/continuity check cell channel comparator 21. Further, when the alarm state of a specified connection is varied, namely, it is declared or released, the alarm cell channel registration part 24 generates an interrupt signal to the CPU. The CPU can grasp the contents stored in the alarm cell channel registration part 24.

The alarm release time reference register 25 is adapted to store the reference value for the alarm state release therein. The alarm release time reference register 25 provides the stored reference value to the alarm timer part 22. A default value of the alarm release time reference register 25 may preferably be 3 sec. Alternatively, the default value of the alarm release time reference register 25 may be any value other than 3 sec under the control of the CPU.

Figure 3:
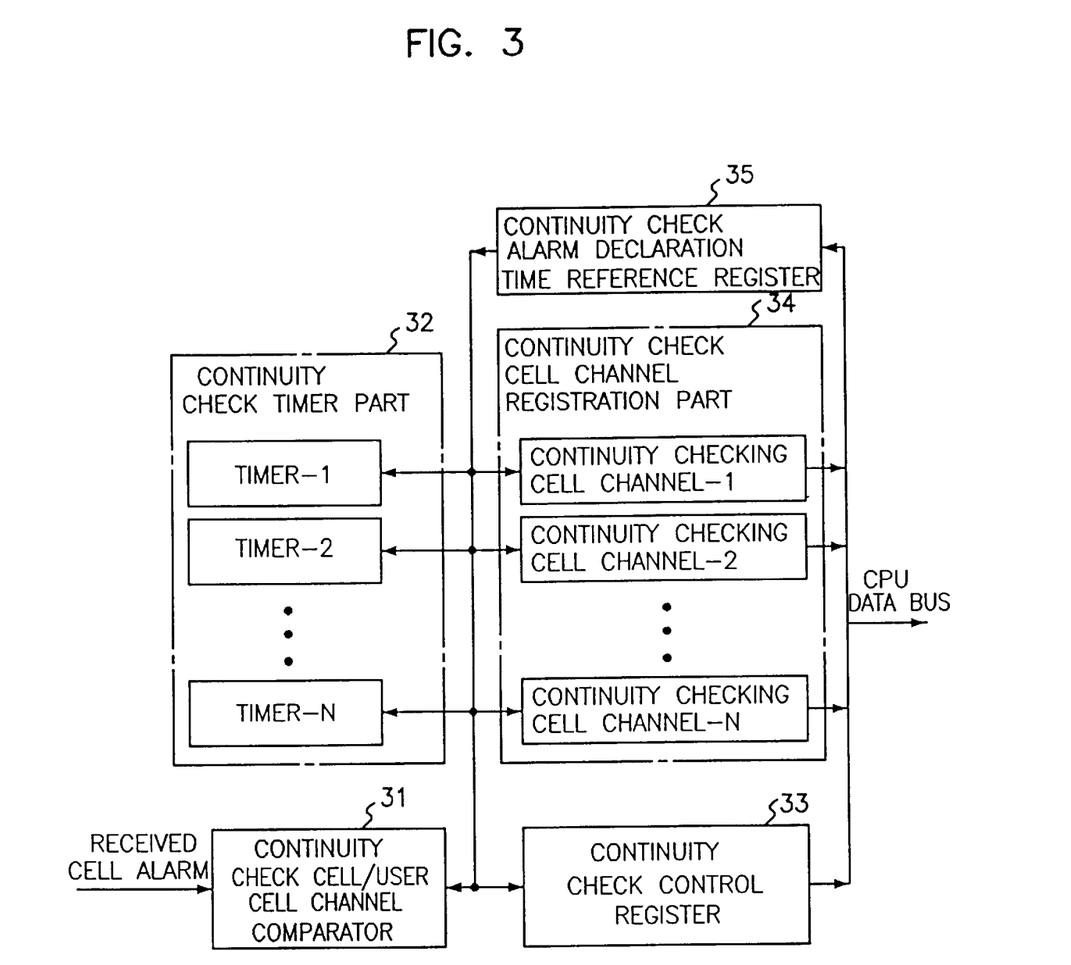
FIG. 3 is a detailed block diagram illustrating the construction of a continuity check cell processor in the fault management cell processing part in FIG. 1 in accordance with the embodiment of the present invention.

FIG. 3 is a detailed block diagram illustrating the construction of the continuity check cell processor 30 in the fault management cell processing part 4 in FIG. 1 in accordance with the embodiment of the present invention. In this drawing, the reference numeral 31 designates a continuity check cell/user cell channel comparator, the reference numeral 32 designates a continuity check timer part, the reference numeral 33 designates a continuity check control register, the reference numeral 34 designates a continuity check cell channel registration part and the reference numeral 35 designates a continuity check alarm declaration time reference register.

The continuity check cell/user cell channel comparator 31 is adapted to receive the channel identifier VPI/VCI of the received user cell from the received user cell monitor 1 and the channel identifier VPI/VCI of the continuity check cell from the OAM cell classification part 3. The continuity check cell/user cell channel comparator 31 compares the received channel identifiers VPI/VCI with channel identifiers VPI/VCI of active connections from the continuity check cell channel registration part 34. Then, the continuity check cell/user cell channel comparator 31 generates match signals corresponding respectively to the active connections in accordance with the compared results and outputs the generated match signals to the continuity check timer part 32.

The continuity check cell/user cell channel comparator 31 performs the channel identifier comparison operation with respect to only connections which are made active in the continuity check control register 33. Also, the continuity check cell/user cell channel comparator 31 performs the channel identifier comparison operation by filtering only a specified portion of the headers of the continuity check cell and user cell according to the type (user network interface/network node interface) of an interface to be applied and the type (F4/F5) of a level of OAM-processing.

The continuity check timer part 32 includes a plurality of timers corresponding respectively to continuity check connections in the continuity check cell channel registration part 34. The operation of each timer in the continuity check timer part 32 is automatically started when the corresponding continuity check connection is made active in the continuity check control register 33, and reset in response to the corresponding match signal from the continuity check cell/user cell channel comparator 31. At the moment that an output value from each timer in the continuity check timer part 32 becomes the same as a reference value stored in the continuity check alarm declaration time reference register 35, the continuity check cell channel registration part 34 declares the continuity check alarm state of the corresponding continuity check connection. Then, each timer in the continuity check timer part 32 maintains its output value as it is. When the output value from the timer in the continuity check timer part 32 corresponding to the continuity check connection of the declared continuity check alarm state becomes smaller than the reference value stored in the continuity check alarm declaration time reference register 35, the continuity check cell channel registration part 34 releases the continuity check alarm state of the corresponding continuity check connection. Each timer in the continuity check timer part 32 transfers the continuity check state of the corresponding continuity check connection to the continuity check control register 33. As a result, the continuity check control register 33 transfers the continuity check state contents of the continuity check connections in the continuity check cell channel registration part 34 to the CPU.

The continuity check control register 33 is set under the control of the CPU to indicate an active one of the continuity check connections in the continuity check cell channel registration part 34.

The continuity check cell channel registration part 34 is adapted to store therein alarm states of continuity check channels which are processed in a hardware manner and channel identifiers of continuity check connections. Also, the continuity check cell channel registration part 34 is operated in response to the continuity check states of the continuity check connections from the continuity check timer part 32 to generate an interrupt signal to the CPU when the continuity check alarm state of a specified one of the continuity check connections is varied, namely, it is declared or released.

The continuity check alarm declaration time reference register 35 is adapted to store the reference value for the continuity check alarm state declaration therein. The continuity check alarm declaration time reference register 35 provides the stored reference value to the continuity check timer part 32. A default value of the continuity check alarm declaration time reference register 35 may preferably be 3.5 sec. Alternatively, the default value of the continuity check alarm declaration time reference register 35 may be any value other than 3.5 sec under the control of the CPU.

Figure 4:
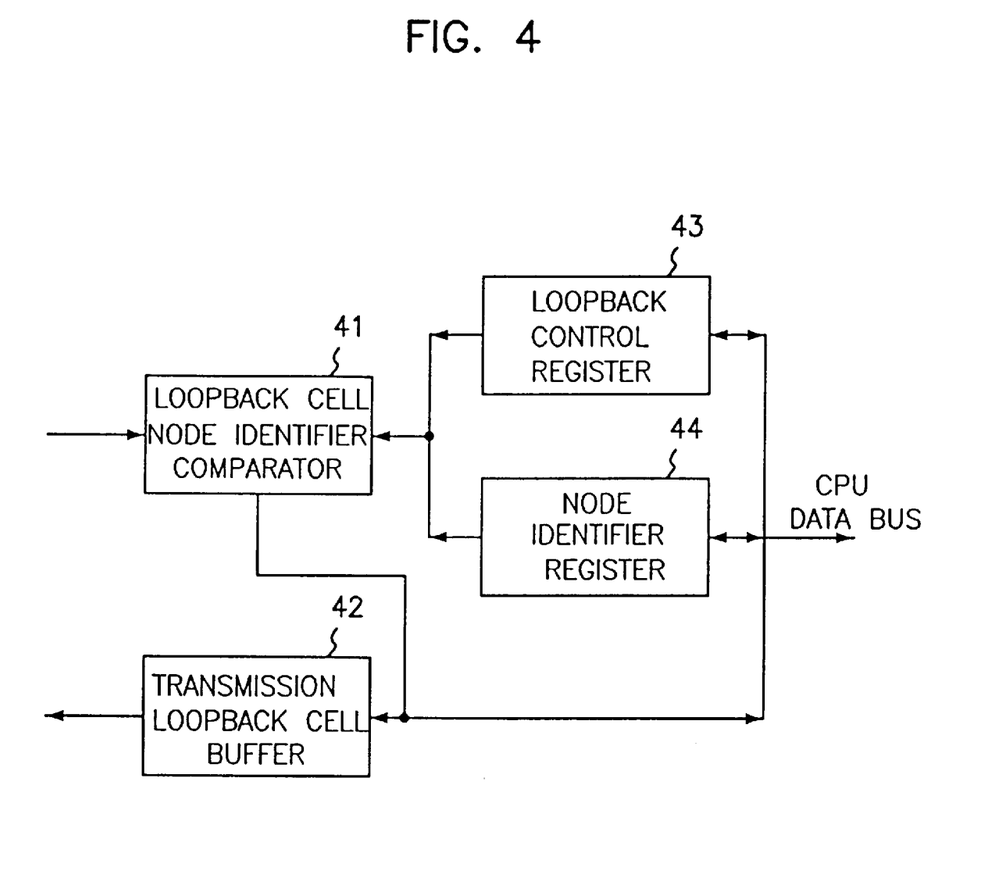
FIG. 4 is a detailed block diagram illustrating the construction of a loopback cell processor in the fault management cell processing part in FIG. 1 in accordance with the embodiment of the present invention.

FIG. 4 is a detailed block diagram illustrating the construction of the loopback cell processor 40 in the fault management cell processing part 4 in FIG. 1 in accordance with the embodiment of the present invention. In this drawing, the reference numeral 41 designates a loopback cell node identifier comparator, the reference numeral 42 designates a transmission loopback cell buffer, the reference numeral 43 designates a loopback control register and the reference numeral 44 designates a node identifier register.

The loopback cell node identifier comparator 41 is adapted to compare the call source identifier of the received loopback cell from the OMA/META cell classification part 3 with a node identifier stored in the node identifier register 44 when the loopback indicator of the received loopback cell is "0". Also, the loopback cell node identifier comparator 41 compares the loopback location identifier of the received loopback cell with the node identifier stored in the node identifier register when the loopback indicator of the received loopback cell is "1". When an error occurs in comparing the call originating identifier and loopback location identifier of the received loopback cell with the node identifier stored in the node identifier register, the loopback cell node identifier comparator 41 discards the received loopback cell. When the call originating identifier of the received loopback cell is matched with the node identifier stored in the node identifier register under the condition that the loopback indicator of the received loopback cell is "0", the loopback cell node identifier comparator 41 transfers the information of the received loopback cell to the OAM cell memory 10. When the loopback location identifier of the received loopback cell is matched with the node identifier stored in the node identifier register under the condition that the loopback indicator of the received loopback cell is "1", the loopback cell node identifier comparator 41 transfers the information of the received loopback cell to the OAM cell memory 10 or the transmission loopback cell buffer 42 in response to a control command from the loopback control register 43.

The transmission loopback cell buffer 42 is adapted to transfer the output of the loopback cell node identifier comparator 41 to a transmission stage.

The loopback control register 43 is adapted to store therein control information required in checking the call originating identifier and loopback location identifier of the received loopback cell and processing the received loopback cell when the loopback indicator of the received loopback cell is "1". The loopback control register 43 is set under the control of the CPU.

The node identifier register 44 is adapted to store therein an identifier of a node to which the loopback cell processor 40 is applied. The node identifier register 44 transfers the stored node identifier to the loopback cell node identifier comparator 41 for the comparison with the call source identifier and loopback location identifier of the received loopback cell.

Figure 5:
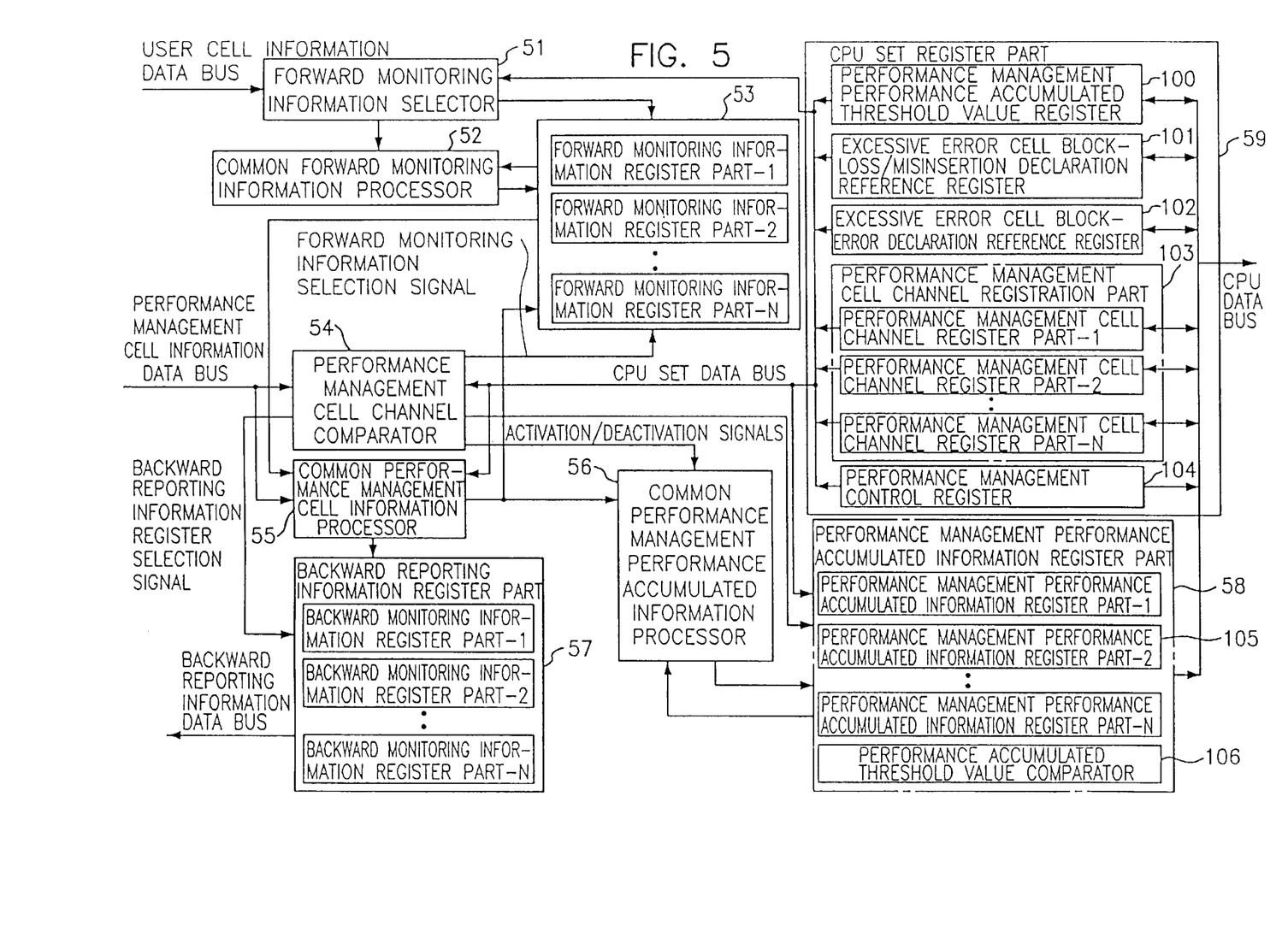
FIG. 5 is a detailed block diagram illustrating the construction of a performance management cell processing part in FIG. 1 in accordance with the embodiment of the present invention.

FIG. 5 is a detailed block diagram illustrating the construction of the performance management cell processing part 5 in FIG. 1 in accordance with the embodiment of the present invention. In this drawing, the reference numeral 51 designates a forward monitoring information selector, the reference numeral 52 designates a common forward monitoring information processor, the reference numeral 53 designates a forward monitoring information register part, the reference numeral 54 designates a performance management cell channel comparator, the reference numeral 55 designates a common performance management cell information processor, the reference numeral 56 designates a common performance management performance accumulated information processor, the reference numeral 57 designates a backward reporting information register part, the reference numeral 58 designates a performance management performance accumulated information register part and the reference numeral 59 designates a CPU set register part.

The forward monitoring information selector 51 is adapted to receive the BIP-16 value, cell loss priority value CLP and connection identifier from the received user cell monitor 1. The forward monitoring information selector 51 transfers the received BIP-16 value and cell loss priority value CLP directly to the common forward monitoring information processor 52. Also, the forward monitoring information selector 51 generates a forward monitoring information selection signal in response to the received connection identifier and outputs the generated forward monitoring information selection signal to the forward monitoring information register part 53. The forward monitoring information register part 53 outputs an RX_CELL 0+1 value, an RX_CELL 0 value and a BIP-16 value corresponding to the forward monitoring information selection signal from the forward monitoring information selector 51 to the common forward monitoring information processor 52. Here, the RX_CELL 0+1 value and RX_CELL 0 value from the forward monitoring information register part 53 are values accumulated with respect to user cells received up to the present. Also, the BIP-16 value from the forward monitoring information register part 53 is a value accumulated with respect to user cells received in the unit of performance management block.

As stated previously, the connection identifier is the internal value of the received user cell monitor 1 which is mapped onto the channel identifier VPI/VCI of the header of the received user cell. Only when the number of the connection identifier of the received user cell monitor 1 is the same as the number of connections to be distinguished in a performance management cell channel registration part 103, can it be mapped onto the channel identifier VPI/VCI of the header of the received user cell.

The common forward monitoring information processor 52 is adapted to update the RX_CELL 0+1 value, RX_CELL 0 value and BIP-16 value from the forward monitoring information register part 53 in response to the BIP-16 value and cell loss priority value CLP from the forward monitoring information selector 51 and to supply the updated RX_CELL 0+1 value, RX_CELL 0 value and BIP-16 value to the forward monitoring information register part 53. The common forward monitoring information processor 52 increments the RX_CELL 0+1 value from the forward monitoring information register part 53 by one regardless of the cell loss priority value CLP from the forward monitoring information selector 51 whenever a user cell is received. Also, the common forward monitoring information processor 52 increments the RX_CELL 0 value from the forward monitoring information register part 53 by one when the cell loss priority value CLP from the forward monitoring information selector 51 is "0". Such an update operation may be performed by a counter of modulo 65536. Further, the common forward monitoring information processor 52 updates the BIP-16 value from the forward monitoring information register part 53 by taking an even parity of the BIP-16 value from the forward monitoring information selector 51 and the BIP-16 value from the forward monitoring information register part 53.

The forward monitoring information register part 53 is adapted to output the RX_CELL 0+1 value, RX_CELL 0 value and BIP-16 value corresponding to the forward monitoring information selection signal from the forward monitoring information selector 51 to the common forward monitoring information processor 52. Also, the forward monitoring information register part 53 stores the updated RX_CELL 0+1 value, RX_CELL 0 value and BIP-16 value from the common forward monitoring information processor 52.

The performance management cell channel comparator 54 is adapted to receive the channel identifier of the performance management cell from the OAM/META cell classification part 3 and a channel identifier from the performance management cell channel registration part 103 and to compare the received channel identifiers with each other. The performance management cell channel comparator 54 performs the channel identifier comparison operation with respect only to connections which are made active in a performance management control register 104. Also, the performance management cell channel comparator 54 performs the channel identifier comparison operation by filtering only a specified portion of the header of the performance management cell according to the type (user network interface/network node interface) of an interface to be applied and the type (F4/F5) of a level of OAM-processing.

When where the performance management cell from the OAM/META cell classification part 3 is a forward monitoring cell, the performance management cell channel comparator 54 generates a forward monitoring information selection signal and a backward reporting information register selection signal in response to a connection identifier obtained from the compared result and outputs the generated forward monitoring information selection signal to the forward monitoring information register part 53 to extract an RX_CELL 0+1 value, an RX_CELL 0 value and a BIP-16 value corresponding to the obtained connection identifier from the forward monitoring information register part 53 and to transfer the extracted RX_CELL 0+1 value, RX_CELL 0 value and BIP-16 value to the common performance management cell information processor 55. Also, the performance management cell channel comparator 54 outputs the generated forward monitoring information selection signal to the forward monitoring information register part 53 to store new RX_CELL 0+1 value, RX_CELL 0 value and BIP-16 value from the common performance management cell information processor 55 into a region in the forward monitoring information register part 53 corresponding to the obtained 15. connection identifier.

Further, the performance management cell channel comparator 54 outputs the generated backward reporting information register selection signal to the backward reporting information register part 57 to store backward reporting cell information from the common performance management cell information processor 55 into a region in the backward reporting information register part 57 corresponding to the obtained connection identifier. The backward reporting cell information from the common performance management cell information processor 55 is obtained from the forward monitoring cell.

On the other hand, when the performance management cell from the OAM/META cell classification part 3 is a backward reporting cell or a forward monitoring cell to be performance-accumulated, the performance management cell channel comparator 54 makes the operation of the common performance management performance accumulated information processor 56 active. Namely, when the performance management cell from the OAM/META cell classification part 3 is the backward reporting cell or the forward monitoring cell to be performance-accumulated, the performance management cell channel comparator 54 generates a performance accumulated information selection signal in response to the connection identifier obtained from the compared result and outputs the generated performance accumulated information selection signal to the performance management performance accumulated information register part 58 to extract performance accumulated information corresponding to the obtained connection identifier from the performance management performance accumulated information register part 58 and to transfer the extracted performance accumulated information to the common performance management performance accumulated information processor 56. Also, the performance management cell channel comparator 54 outputs the generated performance accumulated information selection signal to the performance management performance accumulated information register part 58 to store new performance accumulated information from the common performance management performance accumulated information processor 56 into a region in the performance management performance accumulated information register part 58 corresponding to the obtained connection identifier.

Further, the performance management cell channel comparator 54 receives information about whether the forward monitoring cell is to be performance-accumulated, from the performance management control register 104.

The common performance management cell information processor 55 includes a 32-bit timer for producing a backward reporting cell when the performance management cell from the OAM/META cell classification part 3 is a forward monitoring cell. The 32-bit timer is operated in the unit of 1 $\mu$sec.

When the performance management cell from the OAM/META cell classification part 3 is a forward monitoring cell, the common performance management cell information processor 55 extracts information from the forward monitoring cell. The extracted information includes a forward monitoring cell sequence number MCSN, the total number TUC 0+1 of transmission user cells with a cell loss priority value CLP of "0" or "1", the total number TUC 0 of transmission user cells with a cell loss priority value CLP of "0" and a forward BIP-16 value. The common performance management cell information processor 55 also receives the RX_CELL 0+1 value, RX_CELL 0 value and BIP-16 value from the forward monitoring information register part 53. Then, in response to the extracted information and the received values, the common performance management cell information processor 55 produces a backward reporting cell including the total number TUC 0+1 of transmission user cells with the cell loss priority value CLP of "0" or "1", the total number TUC 0 of transmission user cells with the cell loss priority value CLP of "0", the total number TRCC 0+1 of received user cells with the cell loss priority value CLP of "0" or "1", the total number TRCC 0 of received user cells with the cell loss priority value CLP of "0" and a block error result BLER 0+1. The backward reporting cell produced by the common performance management cell information processor 55 also includes a backward reporting cell sequence number MCSN which is incremented by one whenever the backward reporting cell is produced. The backward reporting cell sequence number MCSN may be coded by a counter of modulo 65536. The backward reporting cell produced by the common performance management cell information processor 55 further includes a time stamp TSTP which is obtained by coding a timer value in the common performance management cell information processor 55 when the backward reporting cell is transferred. The common performance management cell information processor 55 produces the backward reporting cell in the above manner and outputs the produced backward reporting cell to the backward reporting information register part 57.

When the performance accumulation is made active with respect to the forward monitoring cell in the performance management control register 104, the common performance management cell information processor 55 transfers information for the performance accumulation to the common performance management performance accumulated information processor 56. The information transferred from the common performance management cell information processor 55 includes the forward monitoring cell sequence number MCSN extracted from the forward monitoring cell and the total number TUC 0+1 of transmission user cells with the cell loss priority value CLP of "0" or "1", the total number TUC 0 of transmission user cells with the cell loss priority value CLP of "0", the total number TRCC 0+1 of received user cells with the cell loss priority value CLP of "0" or "1", the total number TRCC 0 of received user cells with the cell loss priority value CLP of "0" and the block error result BLER 0+1, obtained from the produced backward reporting cell. In this manner, the performance accumulation is selectively performed with respect to the forward monitoring cell. As a result, a limited internal performance accumulated region can efficiently be used.

As mentioned above, the information produced by the common performance management cell information processor 55 when the performance management cell from the OAM/META cell classification part 3 is the forward monitoring cell includes the backward reporting cell sequence number MCSN, the total number TUC 0+1 of transmission user cells with the cell loss priority value CLP of "0" or "1", the total number TUC 0 of transmission user cells with the cell loss priority value CLP of "0", the total number TRCC 0+1 of received user cells with the cell loss priority value CLP of "0" or "1", the total number TRCC 0 of received user cells with the cell loss priority value CLP of "0", the time stamp TSTP and the block error result BLER 0+1. The regions of such information are marked, defined and processed according to ITU_T I.610.

Also when the performance management cell from the OAM/META cell classification part 3 is the forward monitoring cell, the common performance management cell information processor 55 transfers the total number TUC 0+1 of transmission user cells with the cell loss priority value CLP of "0" or "1" and the total number TUC 0 of transmission user cells with the cell loss priority value CLP of "0" to the forward monitoring information register part 53 to substitute them for the RX_CELL 0+1 value and RX_CELL 0 value from the forward monitoring information register part 53 corresponding to the connection identifier obtained in the performance management cell channel comparator 54. Also, the common performance management cell information processor 55 resets to "0" the BIP-16 value from the forward monitoring information register part 53 corresponding to the connection identifier obtained in the performance management cell channel comparator 54. In other words, the BIP-16 value produced in the unit of performance management block is initialized to "0" whenever the forward monitoring cell is received. Also, the RX_CELL 0+1 value and RX_CELL 0 value are substituted with the values TUC 0+1 and TUC 0 of the received forward monitoring cell. As a result, the forward user cell monitoring operation can be performed in the unit of cell block.

On the other hand, when the performance management cell from the OAM cell classification part 3 is a backward reporting cell, the common performance management cell information processor 55 extracts information from the backward reporting cell. The extracted information includes a backward reporting cell sequence number MCSN, the total number TUC 0+1 of transmission user cells with the cell loss priority value CLP of "0" or "1", the total number TUC 0 of transmission user cells with the cell loss priority value CLP of "0", a time stamp TSTP, the total number TRCC 0+1 of received user cells with the cell loss priority value CLP of "0" or "1", the total number TRCC 0 of received user cells with the cell loss priority value CLP of "0" and a block error result BLER 0+1. Then, the common performance management cell information processor 55 outputs the extracted backward reporting cell information to the performance management performance accumulated information register part 58.

As mentioned above, the common performance management cell information processor 55 includes the 32-bit timer which is operated in the unit of 1 $\mu$sec. The 32-bit timer functions to selectively transfer the backward performance accumulated information from the forward monitoring cell and backward reporting cell to the CPU. At this time, the common performance management cell information processor 55 transfers an output value from the 32-bit timer to the timer together with the backward performance accumulated information. Such a CPU transfer function can provide performance information such as a cell delay deviation CDV and software performance accumulated information.

The common performance management performance accumulated information processor 56 is operated upon receiving an active signal from the performance management cell channel comparator 54. When being operated, the common performance management performance accumulated information processor 56 receives the performance associated cell information from the common performance management cell information processor 55 and the performance accumulated information from the performance management performance accumulated information register part 58 corresponding to the connection identifier obtained in the performance management cell channel comparator 54. Then, the common performance management performance accumulated information processor 56 updates the received performance accumulated information in response to the received performance associated cell information and transfers the updated performance accumulated information to the performance management performance accumulated information register part 58.

The performance associated cell information from the common performance management cell information processor 55 includes a forward monitoring/backward reporting cell sequence number MCSN, the total number TUC 0+1 of transmission user cells with the cell loss priority value CLP of "0" or "1", the total number TUC 0 of transmission user cells with the cell loss priority value CLP of "0", the total number TRCC 0+1 of received user cells with the cell loss priority value CLP of "0" or "1", the total number TRCC 0 of received user cells with the cell loss priority value CLP of "0" and a block error result BLER 0+1.

The performance accumulated information from the performance management performance accumulated information register part 58 includes a forward monitoring/backward reporting cell sequence number MCSN, the total number TUC 0+1 of transmission user cells with the cell loss priority value CLP of "0" or "1" and the total number TUC 0 of transmission user cells with the cell loss priority value CLP of "0". These values are information extracted from the just previous performance management OAM cell on the corresponding connection. Other information transferred from the performance management performance accumulated information register part 58 totals eleven performance information accumulated with respect to the corresponding connection.

The common performance management performance accumulated information processor 56 calculates the absolute number of cell blocks transferred between the successive two performance management OAM cells using the successive two forward monitoring/backward reporting cell sequence numbers MCSN.

Also, the common performance management performance accumulated information processor 56 compares the total numbers TUC 0+1 of transmission user cells with the cell loss priority value CLP of "0" or "1", extracted from the successive two performance management OAM cells, with each other to calculate the absolute number of user cells with the cell loss priority value CLP of "0" or "1", transferred between the successive two performance management OAM cells at the transmission stage. Further, the common performance management performance accumulated information processor 56 compares the total number TRCC 0+1 of received user cells with the cell loss priority value CLP of "0" or 1, extracted from the present performance management OAM cell, with the total number TUC 0+1 of transmission user cells with the cell loss priority value CLP of "0" or 1, extracted from the previous performance management OAM cell, to calculate the absolute number of user cells with the cell loss priority value CLP of "0" or "1", received between the successive two performance management OAM-cells at the reception stage. In this manner, the common performance management performance accumulated information processor 56 calculates the absolute number of loss/misinsertion cells among the user cells with the cell loss priority value CLP of "0" or "1", produced between the successive two performance management OAM cells.

Also, the common performance management performance accumulated information processor 56 compares the total numbers TUC 0 of transmission user cells with the cell loss priority value CLP of "0", extracted from the successive two performance management OAM cells, with each other to calculate the absolute number of user cells with the cell loss priority value CLP of "0", transferred between the successive two performance management OAM cells at the transmission stage. Further, the common performance management performance accumulated information processor 56 compares the total number TRCC 0 of received user cells with the cell loss priority value CLP of "0", extracted from the present performance management OAM cell, with the total number TUC 0 of transmission user cells with the cell loss priority value CLP of "0", extracted from the previous performance management OAM cell, to calculate the absolute number of user cells with the cell loss priority value CLP of "0", received between the successive two performance management OAM cells at the reception stage. In this manner, the common performance management performance accumulated information processor 56 calculates the absolute number of lost/misinserted cells among the user cells with the cell loss priority value CLP of "0", produced between the successive two performance management OAM cells.

Then, the common performance management performance accumulated information processor 56 calculates the number of cells discarded or tagged among the user cells with the cell loss priority value CLP of "0", produced between the successive two performance management OAM cells, in response to the absolute number of lost/misinserted cells among the user cells with the cell loss priority value CLP of "0" or "1" and the absolute number of lost/ misinserted cells among the user cells with the cell loss priority value CLP of "0".

Further, the common performance management performance accumulated information processor 56 calculates the number of BIP-16 errors produced between the successive two performance management OAM cells using the block error result BLER 0+1.

The performance accumulated information obtained by the common performance management performance accumulated information processor 56 includes the number MBN of monitored cell blocks, the number ECB of error cell blocks, the number SECB of excessive error cell blocks, the number SECB_E of excessive error cell block_errors, the number SECB_M of excessive error cell block_misinsertions, the number CL of lost cells, the total number TCL of lost cells, the number CM of misinserted cells, the number DISC of discarded cells, the number TAG of tagged cells and the total number PUC of processed user cells, which can be defined and processed as follows:

THE NUMBER MBN OF MONITORED CELL BLOCKS

A 16-bit counter is used to accumulate the number of performance management blocks transferred at the transmission stage using the forward monitoring/backward reporting cell sequence numbers MCSN obtained from the process of the received forward monitoring/backward reporting cells. A default value of a threshold value of the number MBN of monitored cell blocks is "FF00" in hexadecimal which can be set at random. The number MBN of monitored cell blocks is obtained by adding the absolute number of cell blocks transferred between the successive two received OAM cells to the previous performance accumulated value.

THE NUMBER ECB OF ERRORED CELL BLOCKS

An 8-bit counter is used to increment a count by one when the number of BIP-16 errors is one or more or when the number of lost/misinserted cells is one or more. A default value of a threshold value of the number ECB of error cell blocks is "FF" in hexadecimal which can be set at random. The number ECB of error cell blocks is obtained by adding 1 to the previous performance accumulated value when the absolute number of lost/misinserted cells among the user cells with the cell loss priority value CLP of "0" or "1" is one or more or when the number of BIP-16 errors produced between the successive two performance management OAM cells is one or more.

THE NUMBER SECB OF EXCESSIVE ERRORED CELL BLOCKS

An 8-bit counter is used to increment a count by one when the number of BIP-16 errors is M or more or when the number of lost/misinserted cells is K or more. A default value of a threshold value of the number SECB of excessive errored cell blocks is "FF" in hexadecimal which can be set at random. A default value of M is 4 and can be set up to 16 at the maximum. A default value of K is 2 and can be set up to 16 at the maximum. The associated information is stored in an excessive errored cell block_error declaration reference register 102.

THE NUMBER SECB_E OF EXCESSIVE ERRORED CELL BLOCK_ERRORS

An 8-bit counter is used to increment a count by one when the number of BIP-16 errors is M or more. A default value of a critical value of the number SECB_E of excessive errored cell block_errors is "FF" in hexadecimal which can be set at random. A default value of M is 4 and can be set up to 16 at the maximum. The associated information is stored in an excessive errored cell block_loss/misinsertion declaration reference register 101. The number SECB_E of excessive errored cell block_errors is obtained by adding 1 to the previous performance accumulated value when the number of BIP-16 errors produced between the successive two performance management OAM cells is M or more.

THE NUMBER SECB_M OF EXCESSIVE ERRORED CELL BLOCK_MISINSERTIONS

An 8-bit counter is used to increment a count by one when the number of misinserted cells is K or more. A default value of a threshold value of the number SECB_M of excessive errored cell block_misinsertions is "FF" in hexadecimal which can be set at random. A default value of K is 2 and can be set up to 16 at the maximum. The number SECB_M of excessive errored cell block_misinsertions is obtained by adding 1 the previous performance accumulated value when the absolute number of misinserted cells among the user cells with the cell loss priority value CLP of "0" or "1" is K or more.

THE NUMBER CL OF LOST CELLS

A 16-bit counter is used to accumulate the number of lost cells when it is less than K. A default value of a threshold value of the number CL of lost cells is "FF00" in hexadecimal which can be set at random. A default value of K is 2 and can be set up to 16 at the maximum. The number CL of lost cells is obtained by adding 1 to the previous performance accumulated value when the absolute number of lost cells among the user cells with the cell loss priority value CLP of "0" or "1" is less than K.

THE TOTAL NUMBER TCL OF LOST CELLS

A 16-bit counter is used to accumulate the number of lost cells. A default value of a critical value of the total number TCL of lost cells is "FF00" in hexadecimal which can be set at random. A default value of K is 2 and can be set up to 16 at the maximum. The total number TCL of lost cells is obtained by adding the absolute number of lost cells among the user cells with the cell loss priority value CLP of "0" or "1" to the previous performance accumulated value.

THE NUMBER CM OF MISINSERTED CELLS

A 16-bit counter is used to accumulate the number of misinserted cells when it is less than K. A default value of a threshold value of the number CM of misinserted cells is "FF00" in hexadecimal which can be set at random. A default value of K is 2 and can be set up to 16 at the maximum. The number CM of misinserted cells is obtained by adding the absolute number of misinserted cells among the user cells with the cell loss priority value CLP of "0" or "1" to the previous performance accumulated value.

THE NUMBER DISC OF DISCARDED CELLS

A 16-bit counter is used to accumulate the number DISC of discarded cells with the cell loss priority value CLP of "0" in response to the total number TUC 0+1 of transmission user cells with the cell loss priority value CLP of "0" or "1", the total number TUC 0 of transmission user cells with the cell loss priority value CLP of "0", the total number TRCC 0+1 of received user cells with the cell loss priority value CLP of "0" or "1" and the total number TRCC 0 of received user cells with the cell loss priority value CLP of "0", obtained from the process of the received forward monitoring/backward reporting cells. A default value of a threshold value of the number DISC of discarded cells is "FF00" in hexadecimal which can be set at random. The number DISC of discarded cells is obtained by adding the number of discarded cells among the user cells with the cell loss priority value CLP of "0" to the previous performance accumulated value.

THE NUMBER TAG OF TAGGED CELLS

A 16-bit counter is used to accumulate the number TAG of tagged cells with the cell loss priority value CLP of "0" in response to the total number TUC 0+1 of transmission user cells with the cell loss priority value CLP of "0" or "1", the total number TUC 0 of transmission user cells with the cell loss priority value CLP of "0", the total number TRCC 0+1 of received user cells with the cell loss priority value CLP of "0" or "1" and the total number TRCC 0 of received user cells with the cell loss priority value CLP of "0", obtained from the process of the received forward monitoring/backward reporting cells. A default value of a threshold value of the number TAG of tagged cells is "FF00" in hexadecimal which can be set at randomly. The number TAG of tagged cells is obtained by adding the number of tagged cells among the user cells with the cell loss priority value CLP of "0" to the previous performance accumulated value.

THE TOTAL NUMBER PUC OF PROCESSED USER CELLS

A 24-bit counter is used to accumulate the number of user cells in the block transferred at the transmission stage in response to the total number TUC 0+1 of transmission user cells with the cell loss priority value CLP of "0" or "1", obtained from the process of the received forward monitoring/backward reporting cells. A default value of a threshold value of the total number PUC of processed user cells is "FF0000" in hexadecimal which can be set at random. The total number PUC of processed user cells is obtained by adding the absolute number of user cells with the cell loss priority value CLP of "0" or "1", transferred at the transmission stage, to the previous performance accumulated value.

Among the above-mentioned performance accumulated information, the number ECB of errored cell blocks, the number SECB of excessive errored cell blocks, the number SECB_E of excessive errored cell block_errors, the number SECB_M of excessive errored cell block_misinsertions, the number CL of lost cells, the total number TCL of lost cells, the number CM of misinserted cells, the number DISC of discarded cells, the number TAG of tagged cells and the total number PUC of processed user cells are defined according to T1S1.5/94-004 R1 which is the U.S. national standardization organization.

The backward reporting information register part 57 is adapted to store the backward reporting cell information from the common performance management cell information processor 55 in its backward reporting information register corresponding to the backward reporting information register selection signal from the performance management cell channel comparator 54. The backward reporting cell information from the common performance management cell information processor 55 includes the backward reporting cell sequence number MCSN, the total number TUC 0+1 of transmission user cells with the cell loss priority value CLP of "0" or "1", the total number TUC 0 of transmission user cells with the cell loss priority value CLP of "0", the time stamp TSTP, the total number TRCC 0+1 of received user cells with the cell loss priority value CLP of "0" or "1", the total number TRCC 0 of received user cells with the cell loss priority value CLP of "0" and the block error result BLER 0+1. When the backward reporting cell is stored for a specified connection, the backward reporting information register part 57 transfers the backward reporting cell in the reverse direction over a backward reporting cell information data bus at the proper time.

The performance management performance accumulated information register part 58 is adapted to store therein the performance accumulated information with respect to the same number of connections as that of channels in the performance management cell channel registration part 103. The performance management performance accumulated information register part 58 stores the performance accumulated information from the common performance management performance accumulated information processor 56 in its performance management performance accumulated information register 105 corresponding to the performance accumulated information selection signal from the performance management cell channel comparator 54. The performance accumulated information from the common performance management performance accumulated information processor 56 includes the forward monitoring/backward reporting cell sequence number MCSN, the total number TUC 0+1 of transmission user cells with the cell loss priority value CLP of "0" or "1", the total number TUC 0 of transmission user cells with the cell loss priority value CLP of "0" and the newly accumulated eleven performance information. The performance management performance accumulated information register part 58 includes a performance accumulated threshold value comparator 106 for comparing the performance accumulated information of each connection with threshold values stored in a performance management performance accumulated threshold value register 100, respectively. When the performance accumulated information exceed the threshold values stored in the performance management performance accumulated threshold value register 100 as a result of the comparison, the performance accumulated threshold value comparator 106 generates an interrupt signal to the CPU to allow the CPU to read the performance accumulated information.

After reading the performance accumulated information of a specified connection, the CPU controls the performance management control register 104 to initialize the eleven performance accumulated information of the corresponding connection in the performance management performance accumulated information register part 58. Such a control operation of the CPU is performed to prevent the performance accumulated information from being lost because they exceed the maximum threshold value of the performance management performance accumulated information register 105.

However, even when the performance management performance accumulated information register 105 is initialized, the forward monitoring/backward reporting cell sequence number MCSN, the total number TUC 0+1 of transmission user cells with the cell loss priority value CLP of "0" or "1" and the total number TUC 0 of transmission user cells with the cell loss priority value CLP of "0" are maintained as they are, for the calculation of the eleven performance accumulated information from a newly received performance management cell.

The performance management performance accumulated threshold value register 100 is adapted to store the threshold values of the eleven performance accumulated information therein. The CPU can set any values other than the default values of the threshold values. The threshold values of the eleven performance accumulated information are as follows.

The default value of the threshold value of the number MBN of monitored cell blocks is "FF00" in hexadecimal and can be set to a random value within the range of "0000" to "FFFF" in hexadecimal. The default value of the threshold value of the number ECB of errored cell blocks is "FF" in hexadecimal and can be set to a random value within the range of "00" to "FF" in hexadecimal. The default value of the threshold value of the number SECB of excessive errored cell blocks is "FF" in hexadecimal and can be set to a random value within the range of "00" to "FF" in hexadecimal. The default value of the threshold value of the number SECB_E of excessive errored cell block_errors is "FF" in hexadecimal and can be set to a random value within the range of "00" to "FF" in hexadecimal. The default value of the threshold value of the number SECB_M of excessive errored cell block_misinsertions is "FF" in hexadecimal and can be set to a random value within the range of "00" to "FF" in hexadecimal. The default value of the threshold value of the number CL of lost cells is "FF00" in hexadecimal and can be set to a random value within the range of "0000" to "FFFF" in hexadecimal. The default value of the threshold value of the total number TCL of lost cells is "FF00" in hexadecimal and can be set to a random value within the range of "0000" to "FFFF" in hexadecimal. The default value of the threshold value of the number CM of misinserted cells is "FF00" in hexadecimal and can be set to a random value within the range of "0000" to "FFFF" in hexadecimal. The default value of the threshold value of the number DISC of discarded cells is "FF00" and can be set to a random value within the range of "0000" to "FFFF" in hexadecimal. The default value of the threshold value of the number TAG of tagged cells is "FF00" in hexadecimal and can be set to a random value within the range of "0000" to "FFFF" in hexadecimal. The default value of the threshold value of the total number PUC of processed user cells is "FF0000" in hexadecimal and can be set to a random value within the range of "000000" to "FFFFFF" in hexadecimal.

The excessive errored cell block_loss/misinsertion declaration reference register 101 is adapted to set the reference value K of the number of lost/misinserted cells to declare the number SECB of excessive errored cell blocks among the eleven performance accumulated information. The default value of K is 2 and can be set up to 16 at the maximum.

The excessive errored cell block_error declaration reference register 102 is adapted to set the reference value M of the number of BIP-16 errors to declare the number SECB of excessive errored cell blocks among the eleven performance accumulated information. The default value of M is 4 and can be set up to 16 at the maximum.

The performance management cell channel registration part 103 includes N registers for storing a plurality of channel identifiers VPI/VCI required in performing the performance management.

The performance management control register 104 is adapted to activate or deactivate the performance management function for a specified connection in the performance management cell channel registration part 103 and a forward monitoring cell of the specified connection and the initialization function for a performance management performance accumulated information register 105 in the performance management performance accumulated information register part 58 corresponding to the specified connection.

As apparent from the above description, according to the present invention, the received ATM layer OAM cell processing apparatus processes in real time the fault management cell among the ATM layer OAM cells of F4/F5 levels applied to the user network interface and network node interface. Also, the received ATM layer OAM cell processing apparatus of the present invention performs the CRC-10 and CRC-32 operations with respect to the other ATM layer OAM cells such as the activation/deactivation cells, the resource management cell, the system management cell and the meta signaling cell, not processed in real time, to transfer the normal cells to the CPU through the OAM cell memory. Therefore, the received ATM layer OAM cell processing apparatus of the present invention can process the ATM layer OAM cells efficiently. Further, the received ATM layer OAM cell processing apparatus of the present invention processes in real time the performance management cell among the ATM layer OAM cells of F4/F5 levels applied to the user network interface and network node interface. Therefore, the received ATM layer OAM cell processing apparatus of the present invention can accumulate in real time the performance information such as the total number of received performance management cell blocks, the number of received errored cell blocks, the number of received excessive errored cell blocks, the number of lost cells, the number of misinserted cells, the number of discarded cells, the number of tagged cells and the total number of received cells with respect to a specified ATM virtual connection, thereby measuring the service quality and network parameter.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A received asynchronous transfer mode layer Operations and Maintenance (OAM) cell processing apparatus, comprising:

received user cell monitor means for extracting a channel identifier from a header of a received user cell, analyzing an active forward monitoring channel identifier and, when the received user cell corresponds to a specified connection in accordance with the analyzed result, extracting a Bit Interleaved Parity-Sixteen (BIP-16) value from a payload of the received user cell and a cell loss priority value from the header of the received user cell and inferring a connection identifier from the extracted channel identifier;

cyclic redundancy check means for performing a cyclic redundancy check operation with respect to received OAM/META cells, discarding the received OAM/META cells when a cyclic redundancy check error is present in the received OAM/META cells as a result of a cyclic redundancy check operation and outputting the received OAM/META cells as normal cells when no cyclic redundancy check error is present in the received OAM/META cells as a result of the cyclic redundancy check operation;

OAM/META cell classification means for classifying the normal OAM cells from cyclic redundancy check means according to OAM type and function type identifiers, which are used to classify detail OAM cells and meta signalling cells according to specific ATM connection identifiers;

meta signaling cell processing means for receiving a meta signaling cell from OAM cell classification means and transferring the received meta signaling cell without performing a separate process;

activation/deactivation cell processing means for receiving activation/deactivation cells from OAM cell classification means and transferring the received activation/deactivation cells without performing a separate process;

resource management cell processing means for receiving a resource management cell from said OAM/META cell classification means and transferring the received resource management cell without performing a separate process;

system management cell processing means for receiving a system management cell from said OAM/META classification means and transferring the received system management cell without performing a separate process;

central processing unit interface means for performing an interface operation with a central processing unit;

OAM cell storage means for storing therein the meta signaling cell from said meta signaling cell processing means, the activation/deactivation cells from said activation/deactivation cell processing means, the resource management cell from said resource management cell processing means and the system management cell from said system management cell processing means and transferring the stored cells to said central processing unit through said central processing unit interface means;

alarm cell processing means for receiving the channel identifier of the received user cell from said received user cell monitoring means, declaring a first alarm state when it receives a first alarm cell from said OAM/META cell classification means, releasing the first alarm state when it receives no first alarm cell or any busy cell for a predetermined time period, declaring a second alarm state when it receives a second alarm cell from said OAM/META cell classification means and releasing the second alarm state when it receives no second alarm cell for the predetermined time period;

continuity check cell processing means for receiving the channel identifier of the received user cell from said received user cell monitor means and checking whether a user cell from said received user cell monitoring means or a continuity check cell from said OAM/META cell classification means is received for a specified connection within a predetermined time period, when a continuity check cell check function is made active with respect to the specified connection;

loopback cell processing means for receiving a loopback cell from said OAM/META cell classification means and checking a call source identifier and a loopback location identifier of the received loopback cell; and performance management cell processing means for receiving a performance management cell from said OAM/META cell classification means, producing a backward reporting cell when the received performance management cell is a forward monitoring cell, outputting the produced backward reporting cell to transmit to said OAM/META cell processing means, extracting performance information from the received performance management cell when it is a backward reporting cell, accumulating the extracted performance information and transferring the accumulated performance information to said central processing unit through said central processing unit interface means.

2. A received asynchronous transfer mode layer OAM cell processing apparatus as set forth in claim 1, wherein said cyclic redundancy check means includes:

cyclic redundancy check-32 means for performing a cyclic redundancy check-32 operation with respect to the meta signaling cell among the received ATM cells;

cyclic redundancy check-10 means for performing a cyclic redundancy check-10 operation with respect to OAM cells among the received ATM cells; and cyclic redundancy check error accumulation means for accumulating cyclic redundancy check errors and transferring the accumulated value to said central processing unit when it exceeds a predetermined threshold value.

3. A received asynchronous transfer mode layer OAM cell processing apparatus as set forth in claim 1, wherein said alarm cell processing means includes:

alarm cell/user cell/continuity check cell channel comparison means for receiving the channel identifier of the received user cell from said received user cell monitor means and channel identifiers of alarm cell and continuity check cell from said OAM/META cell classification means, comparing the received channel identifiers with channel identifiers of active connections and the type of the received alarm cell with an alarm type and generating match signals corresponding respectively to the active connections in accordance with the compared results;

alarm timer means being started in response to alarm connection active information and reset in response to the match signals from alarm cell/user cell/continuity check cell channel comparison means;

alarm cell storage means for storing minimum necessary information from said alarm cell/user cell/continuity check cell channel comparison means, minimum necessary information including the channel identifier, type and error form and position of the received alarm cell;

alarm cell channel registration means for storing therein information states of channels which are processed in a hardware manner and channel identifiers and alarm types of active information connections, transferring the stored connection information to said alarm cell/user cell/continuity check cell channel comparison means and said alarm timer means, making the connections inactive in response to the corresponding match signals from said alarm cell/user cell/continuity check cell channel comparison means and generating an interrupt signal to said central processing unit when the alarm state of a specified connection is varied; and alarm release time reference storage means for storing a reference value for the alarm state release therein and providing the stored reference value to said alarm timer means.

4. A received asynchronous transfer mode layer OAM cell processing apparatus as set forth in claim 1, wherein said continuity check cell processing means includes:

continuity check cell/user cell channel comparison means for receiving the channel identifier of the received user cell from said received user cell monitor means and a channel identifier of a continuity check cell from said OAM/META cell classification means, comparing the received channel identifiers with active channel identifiers, respectively, and generating match signals in accordance with the compared results;

continuity check timer means being started in response to continuity check connection active information and reset in response to the match signals from said continuity check cell/user cell channel comparison means, said continuity check timer means performing a counting operation with respect to the received continuity check cell to output a continuity check state;

continuity check cell channel registration means for storing therein alarm states of continuity check channels which are processed in a hardware manner and channel identifiers of continuity check connections, said continuity check cell channel registration means being operated in response to the continuity check states of the continuity check connections from continuity check timer means to generate an interrupt signal to said central processing unit when the continuity check alarm state of a specified one of the continuity check connections is varied;

continuity check control storage means for indicating an active one of the continuity check connections in said continuity check cell channel registration means; and continuity check alarm declaration time reference storage means for storing a reference value for the continuity check alarm state declaration therein and providing the stored reference value to said continuity check timer means.

5. A received asynchronous transfer mode layer OAM cell processing apparatus as set forth in claim 1, wherein solid cell processing means includes:

loopback cell node identifier comparison means for comparing the call source identifier of the received loopback cell from said OAM/META cell classification means with a node identifier and discarding or transferring the received loopback cell in accordance with the compared result;

transmission loopback cell buffering means for transferring the output of said loopback cell node identifier comparison means to a transmission stage;

loopback control storage means for storing therein control information required in checking the call source identifier and loopback location identifier of the received loopback cell and processing the received loopback cell when a loopback indicator of the received loopback cell is "1"; and node identifier storage means for storing the node identifier therein and transferring the stored node identifier to said loopback cell node identifier comparison means.

6. A received asynchronous transfer mode layer OAM cell processing apparatus as set forth in claim 1, wherein said performance management cell processing means includes:

forward monitoring information selection means for receiving the BIP-16 value, cell loss priority value and connection identifier from said received user cell monitoring means and generating a forward monitoring information selection signal in response to the received connection identifier;

common forward monitoring information processing means for updating an RX_CELL 0+1 value, and RX_CELL 0 value and a BIP-16 value corresponding to the forward monitoring information selection signal from said forward monitoring information selection means in response to the BIP-16 value and cell loss priority value from said forward monitoring information selection means, the RX_CELL 0+1 value and RX_CELL 0 value corresponding to the forward monitoring information selection signal from said forward monitoring information selection means being values accumulated with respect to received user cells, the BIP-16 value corresponding to the forward monitoring information selection signal from said forward monitoring information selection means being a value accumulated with respect to the user cells received in the unit of a performance management block;

forward monitoring information storage means for outputting the RX_CELL 0+1 value, RX_CELL 0 value and BIP-16 value corresponding to the forward monitoring information selection signal from said forward monitoring information selection means to said common forward monitoring information processing means and storing the updated RX_CELL 0+1 value, RX_CELL 0 value and BIP-16 value from said common forward monitoring information processing means therein;

performance management cell channel comparison means for comparing a channel identifier of the performance management cell from said OAM/META cell classification means with an active channel identifier, obtaining a connection identifier in accordance with the compared result, generating a forward monitoring information selection signal and a backward reporting information register selection signal in response to the obtained connection identifier when the performance management cell from said OAM/META cell classification means is a forward monitoring cell, outputting the generated forward monitoring information selection signal to said forward monitoring information register means and generating a performance accumulated information selection signal in response to the obtained connection identifier when the performance management cell from said OAM/META cell classification means is a backward reporting cell or a forward monitoring cell to be performance-accumulated;

common performance management cell information processing means for extracting the total number of transmission user cells with a cell loss priority value of "0" or "1" and the total number of transmission user cells with a cell loss priority value of "0" from the forward monitoring cell when the performance management call from said OAM/META cell classification means if the forward monitoring cell, producing backward reporting cell information in response to the extracted total numbers and an RX_CELL 0+1 value, an RX_CELL 0 value and a BIP-16 value from said forward monitoring information register means corresponding to the forward monitoring information selection signal from said performance management cell channel comparison means, outputting the extracted total numbers to said forward monitoring information register means to substitute them for the RX_CELL 0+1 value and RX_CELL 0 value from said forward monitoring information register means, resetting to "0"

the BIP-16 value from said forward monitoring information register means and extracting information from the backward reporting cell when the performance management cell from said OAM/META cell classification means is the backward reporting cell;

common performance management performance accumulated information processing means being operated in response to an active signal from said performance management cell channel comparison means to update performance accumulated information corresponding to the connection identifier obtained in said performance management cell channel comparison means in response to performance associated cell information from said common performance management cell information processing means;

backward reporting information storage means for storing the backward reporting cell information from said common performance management cell information processing means in its backward reporting information register corresponding to the backward reporting information register selection signal from said performance management cell channel comparison means;

performance management performance accumulated information storage means for storing the performance accumulated information from said common performance management performance accumulated information processing means in [its] the performance management performance accumulated information register corresponding to the performance accumulated information selection signal from said performance management cell channel comparison means, comparing the performance accumulated information of each connection with threshold values, respectively, and generating an interrupt signal to said central processing unit when the performance accumulated information exceed the threshold values as a result of the comparison; and central processing unit set storage means for storing therein the threshold values, a reference value of the number of lost/misinserted cells and a reference value of the number of BIP-16 errors for the declaration of the number of excessive error cell blocks and a plurality of channel identifiers required in performing the performance management and for activating or deactivating the performance management function for a specified connection and a forward monitoring cell of the specified connection and the initialization function for a performance management performance accumulated information register in said performance management performance accumulated information storage means corresponding to the specified connection.

7. A received asynchronous transfer mode layer OAM cell processing apparatus as set forth in claim 6, wherein backward reporting information storage means includes a plurality of backward reporting information registers.

8. A received asynchronous transfer mode layer OAM cell processing apparatus as set forth in claim 6, wherein forward monitoring information storage means includes a plurality of forward monitoring information registers.

9. A received asynchronous transfer mode layer OAM cell processing apparatus as set forth in claim 6, wherein said performance management performance accumulated information storage means includes:

a plurality of performance management performance accumulated information registers for storing therein the performance accumulated information from said common performance management performance accumulated information processing means in response to the performance accumulated information selection signal from said performance management cell channel comparison means; and performance accumulated threshold value comparison means for comparing the performance accumulated information of each connection with the threshold values, respectively, and generating the interrupt signal to said central processing unit when the performance accumulated information exceed the threshold values as a result of the comparison.

10. A received asynchronous transfer mode layer OAM cell processing apparatus as set forth in claim 6, wherein said central processing unit set storage means includes:

performance management performance accumulated threshold value storage means for storing the threshold values of the performance accumulated information therein;

excessive errored cell block_loss/misinsertion declaration reference storage means for storing the reference value of the number of lost/misinserted cells for the declaration of the number of excessive errored cell blocks therein;

excessive errored cell block_error declaration reference storage means for storing the reference value of the number of BIP-16 errors for the declaration of the number of excessive errored cell blocks therein;

performance management cell channel registration means for storing the plurality of channel identifiers required in performing the performance management; and performance management control storage means for activating or deactivating the performance management function for a specified connection in said performance management cell channel registration means and a forward monitoring cell of the specified connection and the initialization function for a performance management performance accumulated information register in said performance management performance accumulated information storage means corresponding to the specified connection.

11. A received asynchronous transfer mode layer OAM cell processing apparatus as set forth in claim 10, wherein said performance management cell channel registration means includes a plurality of performance management cell channel registers.

* * * * *